United States Patent [19]

Parulski et al.

[11] Patent Number: 5,440,343
[45] Date of Patent: Aug. 8, 1995

[54] MOTION/STILL ELECTRONIC IMAGE SENSING APPARATUS

[75] Inventors: Kenneth A. Parulski; Eric G. Stevens, both of Rochester; Robert H. Hibbard, Fairport, all of N.Y.

[73] Assignee: Eastman Kodak Company, Rochester, N.Y.

[21] Appl. No.: 203,237

[22] Filed: Feb. 28, 1994

[51] Int. Cl.⁶ .......................................... H04N 5/335
[52] U.S. Cl. ..................................... 348/316; 348/322; 348/220
[58] Field of Search ............... 348/207, 220, 294, 316, 348/317, 311, 314, 315, 322, 323, 297; H04N 5/335

[56] References Cited

U.S. PATENT DOCUMENTS

| | | | |
|---|---|---|---|
| 4,486,783 | 12/1984 | Tanaka et al. | 348/317 |
| 4,499,496 | 2/1985 | Tanaka et al. | 348/317 |
| 4,541,010 | 9/1985 | Alston | 348/283 |
| 4,656,524 | 4/1987 | Norris et al. | 348/401 |
| 4,656,525 | 4/1987 | Norris | 348/532 |
| 4,691,253 | 9/1987 | Silver | 360/10.1 |
| 4,742,553 | 5/1988 | Irwin | 382/47 |
| 4,750,041 | 6/1988 | Vogel et al. | 348/220 |
| 4,819,059 | 4/1989 | Pape | 348/220 |
| 4,876,590 | 10/1989 | Parulski | 348/281 |
| 4,928,137 | 5/1990 | Kinoshita | 348/297 |

FOREIGN PATENT DOCUMENTS

| | | | |
|---|---|---|---|
| 4-369266 | 12/1992 | Japan | H04N 5/335 |
| 4-373276 | 12/1992 | Japan | H04N 5/335 |
| 5-37861 | 2/1993 | Japan | H04N 5/335 |

OTHER PUBLICATIONS

KAI-1001 Series—1024(H)×1024(V) Pixel-Megapixel Interline CCD Image Sensor Performance Specification—Eastman Kodak Company—Apr. 26, 1993.

Primary Examiner—Michael T. Razavi
Assistant Examiner—Tuan V. Ho
Attorney, Agent, or Firm—David M. Woods

[57] ABSTRACT

An electronic imaging system is provided that records both motion and still video images. In a motion mode of operation, the electronic imaging system records NTSC resolution images at a standard thirty frame per second rate. In a still mode of operation, the electronic imaging system records megapixel resolution still images at a much lower frame rate. The electronic imaging system utilizes an electronic image sensor that incorporates column selective "charge clearing" structures and column selective "charge parking" structures. The charge clearing structures are used to selectively discard the signal charge from certain color pixels. The charge parking structures are used to sum the charge from multiple vertical pixels. The architecture of the electronic image sensor also allows different image aspect ratios to be provided for the motion and still modes described above.

12 Claims, 10 Drawing Sheets

MOTION/STILL ELECTRONIC IMAGE SENSING APPARATUS

FIELD OF THE INVENTION

The invention relates generally to an electronic imaging system. More specifically, the invention relates to an electronic imaging system for capturing images in both a motion mode and a still mode, wherein the electronic imaging system captures medium resolution motion images at a standard frame rate and high resolution still images at a much lower frame rate.

BACKGROUND OF THE INVENTION

Motion/still electronic imaging systems including the capability of recording analog motion images and digital still images on the same recording medium, for example 8 mm or VHS format magnetic tape, have recently been developed by a number of manufacturers. The motion/still camcorders currently available record motion images in the same manner as conventional motion only video recording cameras. In order to record still images, the user activates an operator control to switch to a "still" mode of operation in which image data generated from the systems electronic image sensor is temporarily stored in a digital memory for subsequent recording onto videotape.

Conventional motion/still camcorders utilize the same type of NTSC resolution interlaced electronic image sensors originally developed for motion only electronic camera systems. Although the conventional image sensors provide sufficient data to produce relatively low resolution analog NTSC signals, the image sensors are not capable of generating still images having the high resolution associated with high quality electronic still imaging systems. Some current electronic still imaging systems, for example, are capable of recording over one thousand lines of image information, while only 480 lines of image information are required for one frame of an NTSC video signal.

Of course, a high definition television (HDTV) electronic image sensor could be used in a motion/still camcorder to directly obtain high resolution still images and HDTV motion images, but downconversion would be required to obtain NTSC motion images. In such a case, the electronic image sensor must be capable of operating at pixel data rates of greater than 50M pixels/second. Electronic image sensors capable of operating at such high pixel data rates, however, are typically very costly to produce and have much higher power consumption rates than conventional NTSC compatible sensors.

In view of the above, it is an object of the invention to provide an electronic imaging system that is capable of producing NTSC motion images and high resolution still images. It is a further object of the invention to provide an electronic image sensor for the electronic imaging system, which can be operated in a low resolution mode to provide NTSC resolution motion scenes at the standard thirty frames/second rate, and operated in a high resolution mode to provide high resolution still images at slower frame rates. It is a still further object of the invention to provide an electronic image sensor, as described above, that is less expensive to produce and has lower power consumption requirements than HDTV electronic image sensors.

SUMMARY OF THE INVENTION

The invention provides an electronic imaging system that records both motion and still video images. In a motion mode of operation, the electronic imaging system records NTSC resolution images at a standard thirty frame per second rate. In a still mode of operation, the electronic imaging system records megapixel resolution still images at a much lower frame rate.

The electronic imaging system utilizes an electronic image sensor that includes an array of photosensitive picture element sites, or "pixels" which collect photo-generated charge packets. Each charge packet is a pixel image signal. Image signals are generated from all of the pixels in the still mode of operation. In the motion mode of operation, however, the image signals generated from certain selected pixels are discarded or combined with the signals from nearby pixels in order to generate images at thirty frames per second while using a standard video rate output pixel clock (approximately 12 MHz) instead of an HDTV rate pixel clock (>50 MHz). The electronic image sensor incorporates column selective fast dump "charge clearing" structures and column selective "charge parking" structures. The charge clearing structures are used to selectively discard the signal charge from certain color pixels. The charge parking structures are used to sum the charge from non-adjacent vertical pixels. The architecture of the electronic image sensor also allows different image aspect ratios to be provided for the motion and still modes described above.

BRIEF DESCRIPTION OF THE DRAWINGS

The invention will be described in greater detail with reference to the accompanying drawings wherein.

DETAILED DESCRIPTION OF PREFERRED EMBODIMENTS

Figure 1:
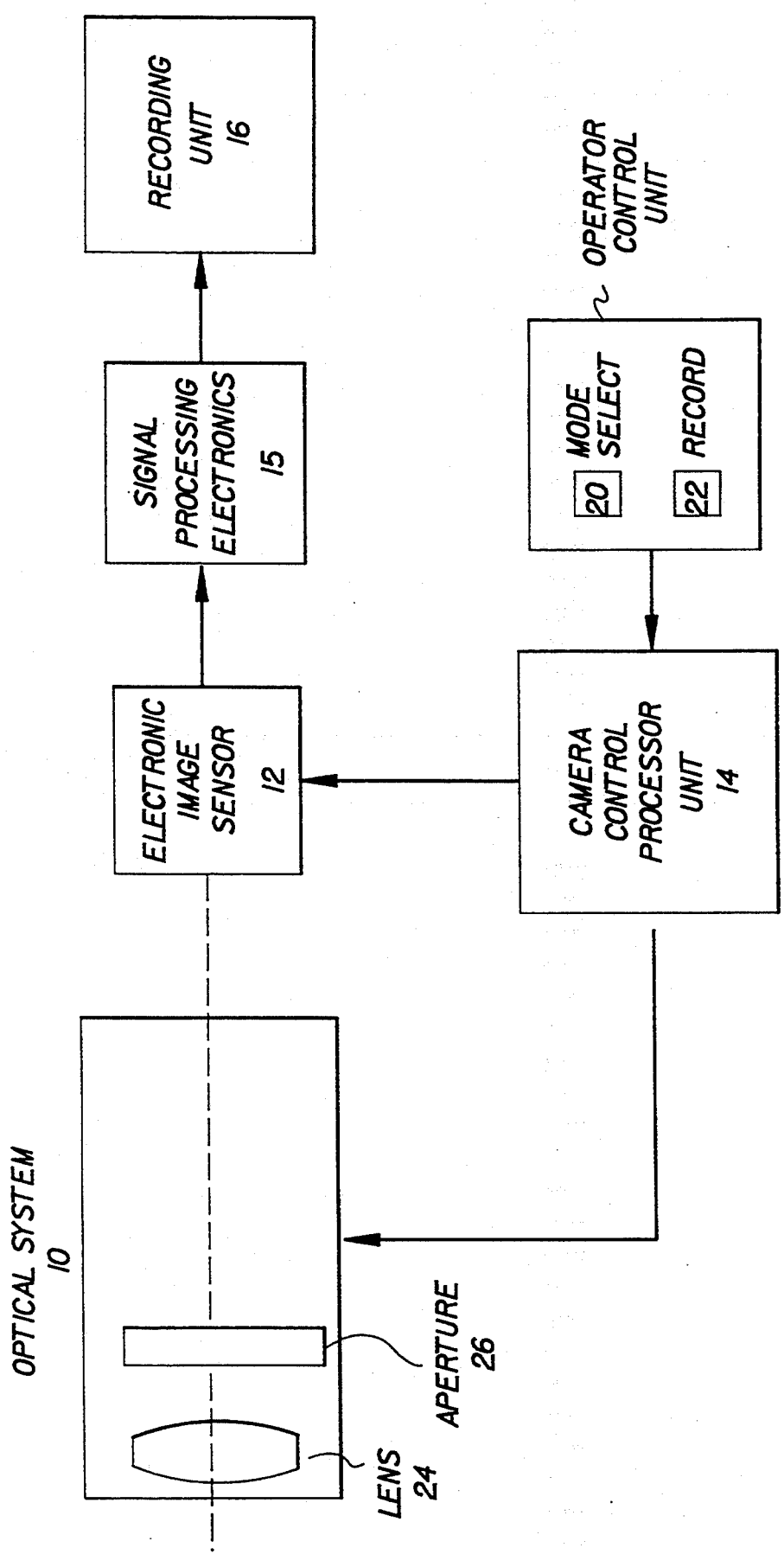
FIG. 1 is a block diagram of an electronic imaging system in accordance with the invention.

A motion/still electronic imaging system according to the invention is illustrated in FIG. 1. The imaging system includes an optical system 10, a motion/still electronic image sensor 12, a camera control processor unit 14, signal processing electronics 15, a recording unit 16, and an operator control unit 18, which includes a mode selection switch 20 and a record or "shutter" control switch 22. An optional flash unit may also be incorporated in the structure of the imaging system or as an accessory item. The optical system 10 of the illustrated embodiment includes a lens 24, and an adjustable aperture 26, which are controlled by the camera control processor unit 14. It will be understood that the invention is not limited to the use of illustrated optical system 10, but is also applicable to imaging systems using any type of known optical system, including those using fixed apertures and systems that utilize mechanical shutter devices.

In operation, a user places the mode switch 20 in a "motion" mode position and depresses the record switch 22 to record motion images. The camera control processor unit 14 controls the operation of the electronic image sensor 12, the signal processing electronics 15, and the recording unit 16 in order to record the output of the electronic image sensor. The recording unit 16 preferably includes a digital magnetic tape recording unit, so that the processed sensor output signal is recorded on a magnetic tape located in the recording unit 16 as an NTSC resolution video image sequence until the record switch 22 is released. To record a still image, the user places the mode switch 20 into the "still" mode position, so that a high resolution still image is captured and recorded by the recording unit 16 each time the record switch 16 is depressed. The recording unit 16 preferably includes digital memory means for storing the still images (for example Flash EPROM memory cards) in addition to the magnetic tape recording unit, although the still images can also be stored on tape if desired.

The electronic image sensor 12 includes a row and column array of pixels that generate signal in response to the amount of radiation incident thereon and at least one horizontal output register. A conventional color filter array (not shown) is provided so that selected pixel sites generate image signals corresponding to red, green and blue color components. In addition to the photosensitive pixels, the electronic image sensor includes column selective "charge clearing" structures and column selective "charge parking" structures. The charge clearing structures are used to selectively discard the signal charge from certain pixels, while the charge parking structures are used to add the charge from non-adjacent vertical pixels.

Figure 2:
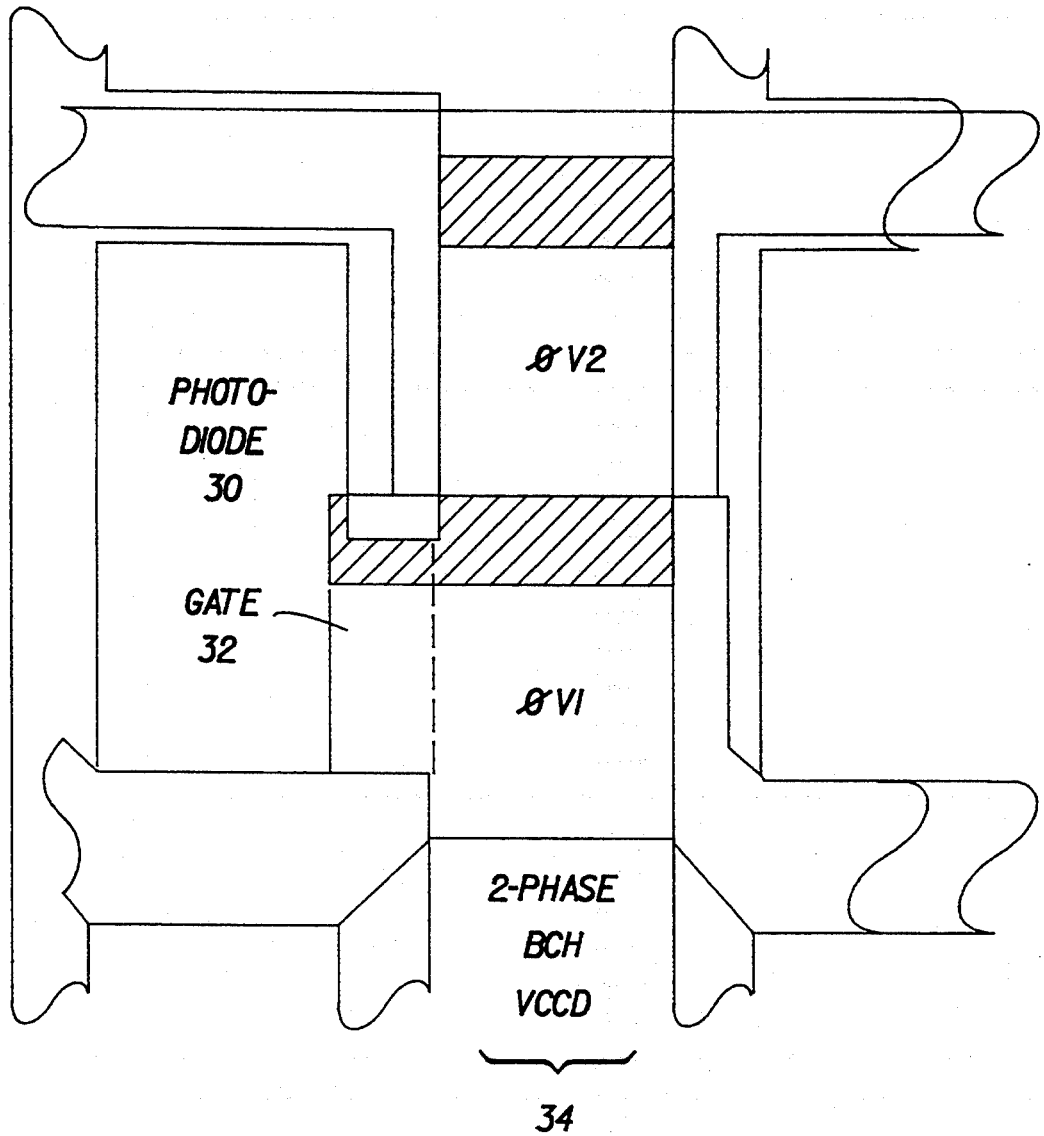
FIG. 2 illustrates an image pixel site of the type incorporated in the electronic image sensor shown in FIG. 1.

FIG. 2 illustrates a top view of one photosensitive pixel of the type included in the array of the electronic image sensor 12. The pixel is of conventional construction, and is preferably of the type incorporated in the KAI-1001 interline image sensor manufactured by the Eastman Kodak Company of Rochester, N.Y. The design and operation of this image sensor is described in "KAI-1001 series Megapixel Interline CCD Image Sensor Performance Specification, " Rev. 1 April 1993, available, from the Microelectronics Technology Division of Eastman Kodak Company, and in "A 1 Megapixel, Progressive-Scan Image Sensor with Anti-blooming Control and Lag-Free Operation" by E. G. Stevens, et al., IEEE Trans. Electron Devices, Vol. 38, May 1991, both of which are incorporated by reference herein. The 9×9 micron pixel site includes a photodiode 30, a transfer gate 32 and a two-phase CCD register 34. The operation of the photosite is well known in the art and need not be discussed in great detail.

Figure 3:
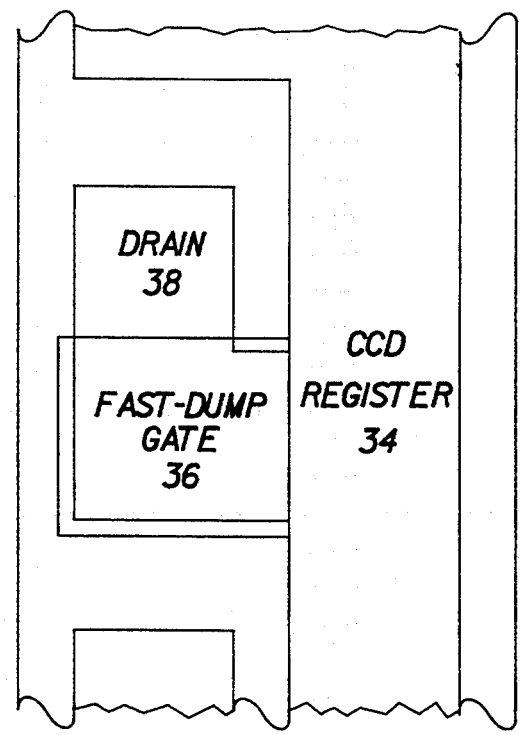
FIG. 3 illustrates a charge clearing structure of the type incorporated in the electronic image sensor shown in FIG. 1.

FIG. 3 illustrates a top view of one of the charge clearing structures incorporated in the electronic image sensor 12. The charge clearing structures are located in selected columns of at least one row of vertical transfer registers located between the two-dimensional array of photosites and a horizontal output register of the electronic image sensor 12 as will be described in greater detail below. The charge clearing structure includes a fast dump gate 36 and a drain 38 located adjacent to the CCD register 34. The fast dump gate 36, when activated, permits charge being transferred in the CCD register 34 to be dumped to the drain 38. The drain 38 may be a separate electrode, as shown in FIG. 11, or, as shown in FIG. 10, it may contact a polysilicon and a metal drain line connected via a bond wire to an external control pin on the sensor package, which is held at an appropriate potential so as to drain the charge from CCD register 34.

Figure 10:
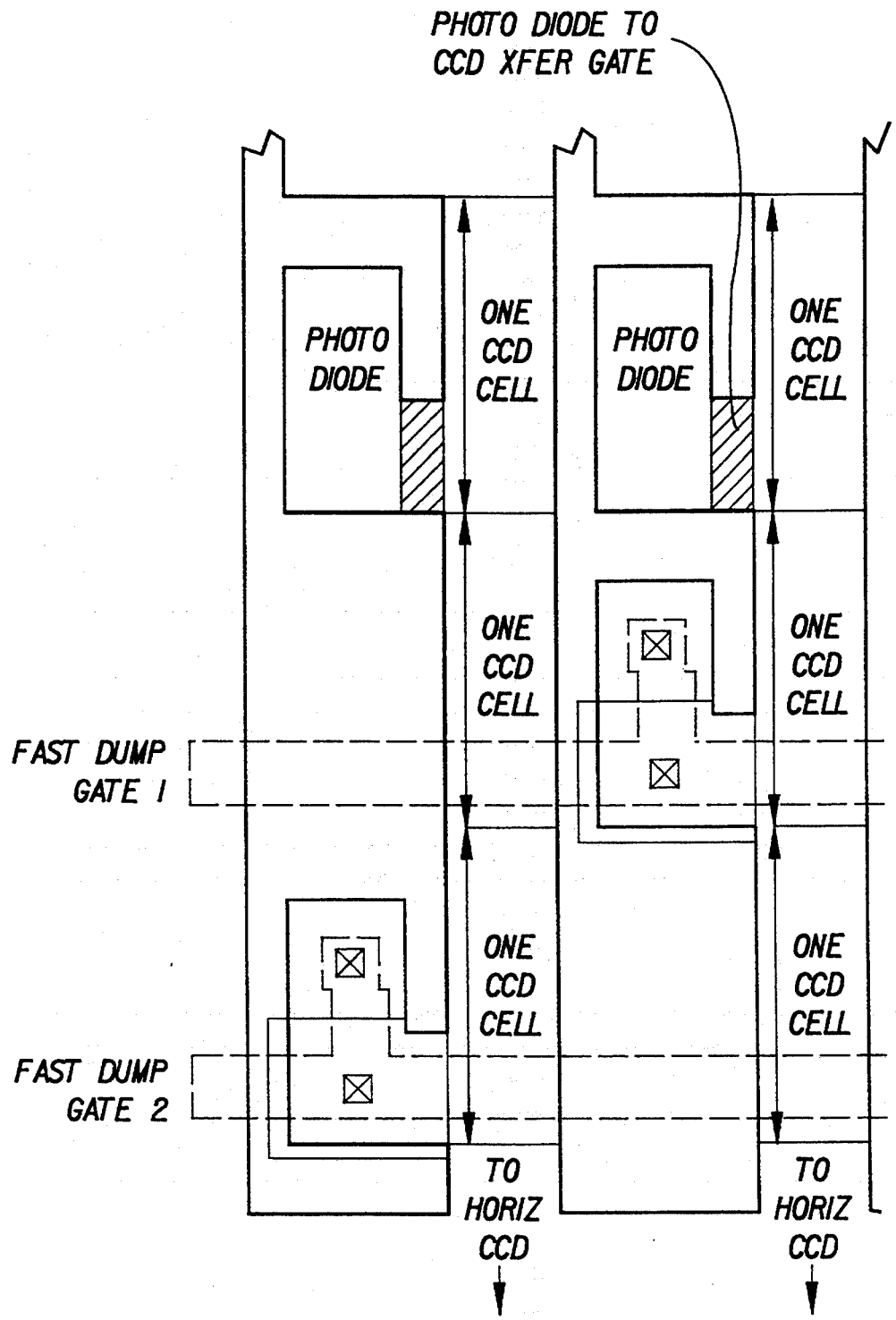
FIGS. 10-12 illustrate three methods of creating column selectable "charge clearing" structures using 2 CCD phases per row.
Figure 11:
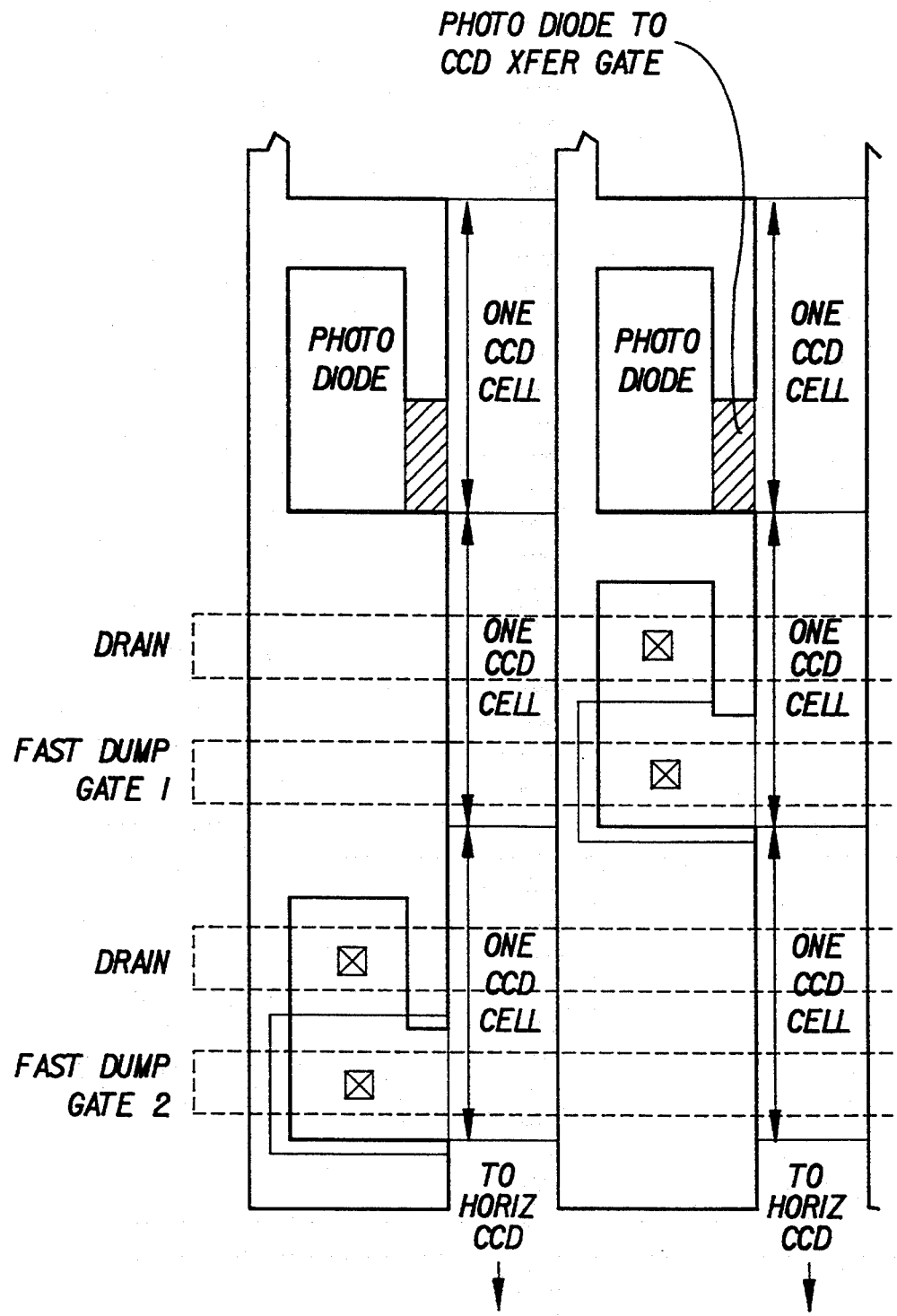
Figure 12:
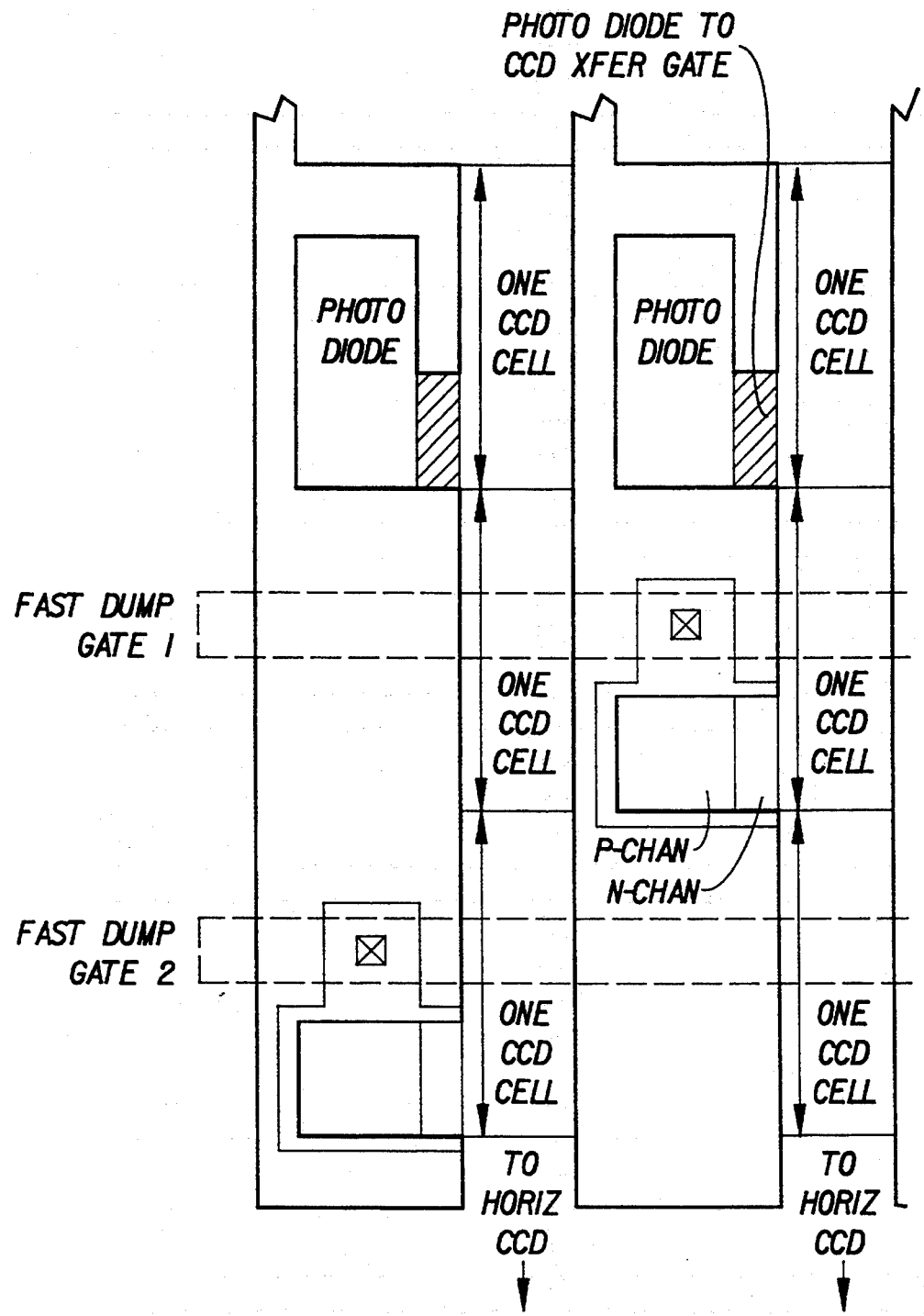
Figure 13:
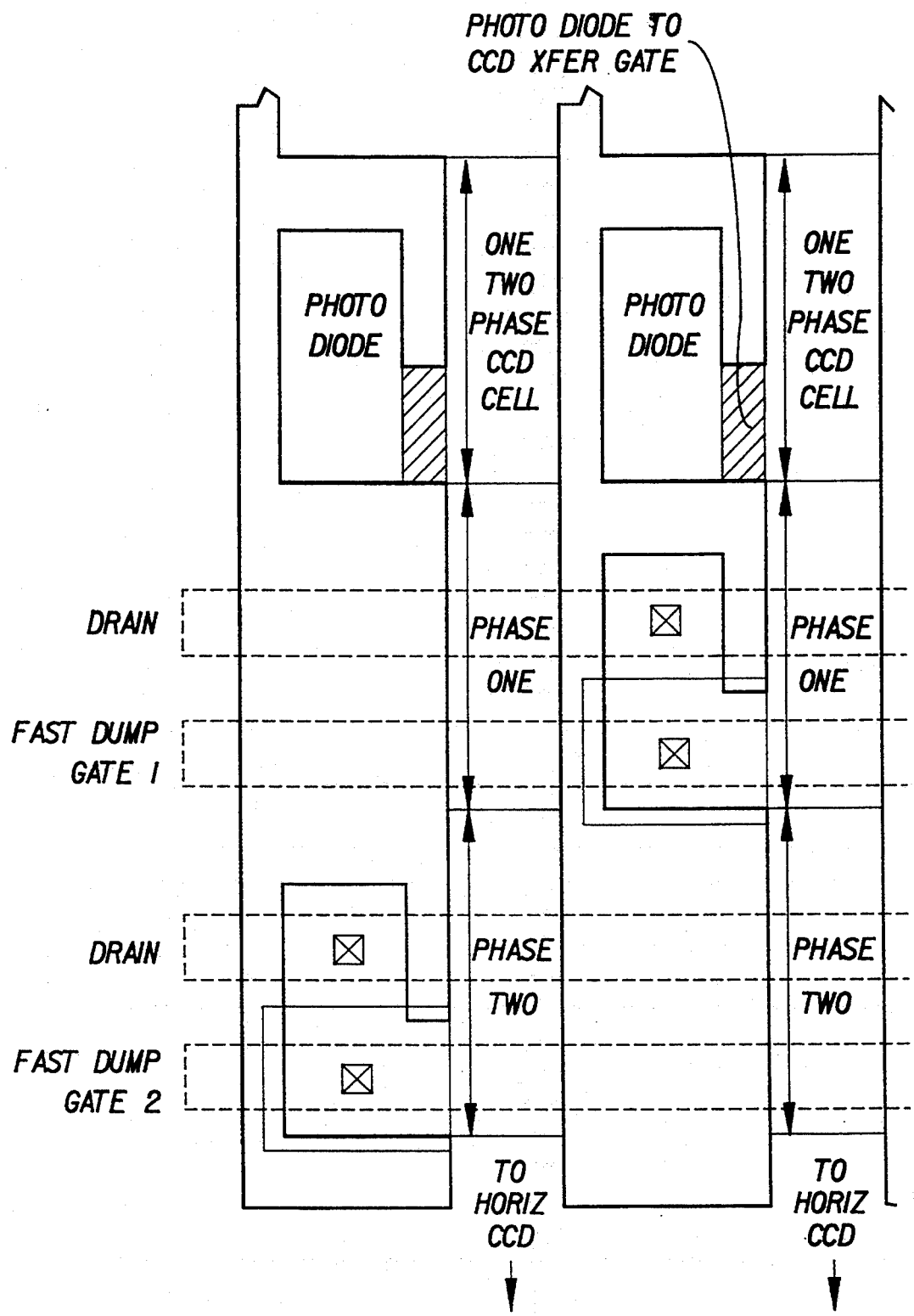
FIG. 13 illustrates a "charge clearing structure using 1 CCD phase per row.

FIGS. 10–12 show different charge clearing structures using one true two-phase CCD cell per row. It is also possible to use charge clearing structures having only one of the two CCD cells per row. This reduces the number of vertical transfer required to transfer the first line of charge from the photosensitive pixel array to the horizontal readout register. FIG. 10 illustrates the use of a surface-channel, fast-dump gate ($V_T > 0$) so that the drain may be connected to the gate, thereby saving a pin. FIG. 11 shows a structure providing a separate gate and drain electrode, as would be required for a buried-channel, fast-dump gate ($V_T > 0$). FIG. 12 shows a charge-clearing structure of a vertical type wherein the drain 38 lies below the gate (the n-type substrate). FIG. 13 shows a charge-clearing structure similar to that of FIG. 11, except that the gate 1 row charge clearing structure is adjacent to phase one of a two phase CCD cell, and the gate 2 row charge clearing structure is adjacent to phase two of the same CCD cells whereas in FIG. 11, each charge clearing structure is adjacent to a two phase CCD cell.

Figure 4:
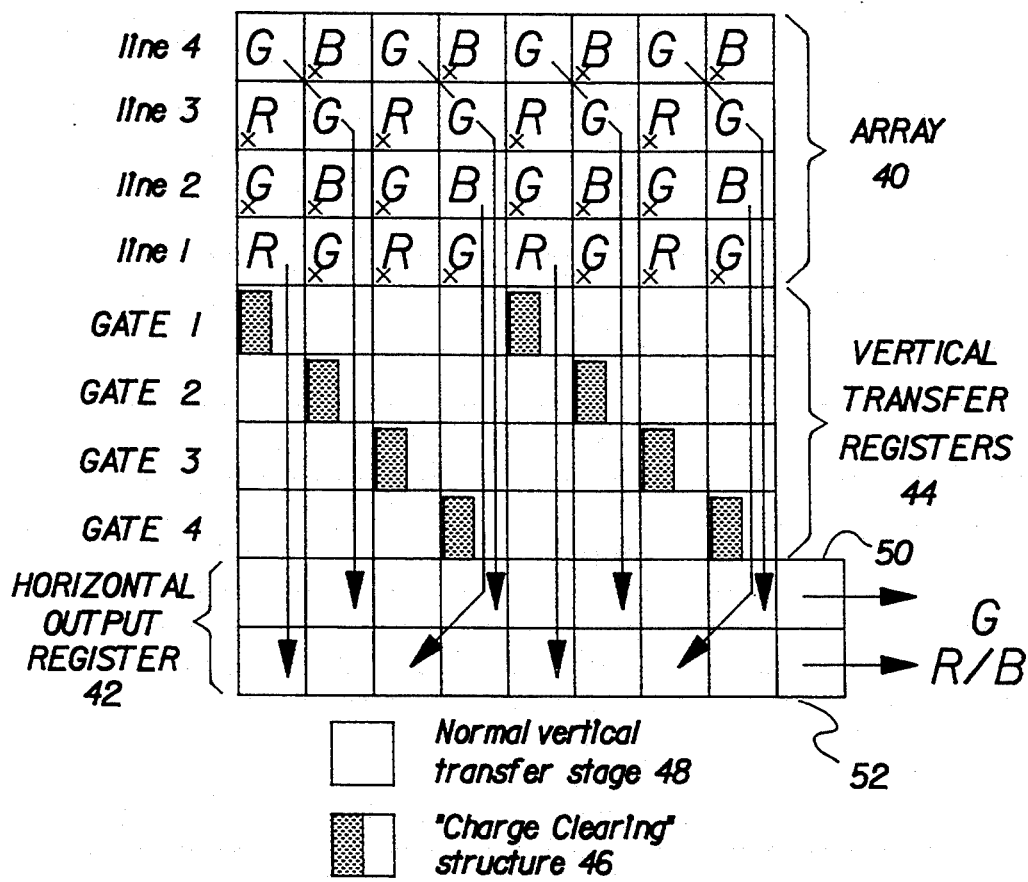
FIG. 4 illustrates a first embodiment of the electronic image sensor shown in FIG. 1.

A preferred image sensor architecture incorporating photosensitive pixels of the type illustrated in FIG. 2 and charge clearing structures of the type illustrated in FIG. 3 is shown in FIG. 4. For purposes of simplification, an array 40 of image pixel sites is shown having just four image lines, although it will be understood that any number of image lines of any desirable length may be employed. The four image lines are separated from a horizontal output register 42 by four rows of vertical transfer registers 44, wherein each row of vertical transfer registers 44 includes at least one charge clearing structure 46 and a plurality of normal or conventional vertical transfer stages 48. The charge clearing structures 46 in each row of vertical transfer registers 44 are respectively controlled by "gate 1", "gate 2", "gate 3" and "gate 4" signals supplied by the camera control processor unit 14 illustrated in FIG. 1. The image pixel sites are arranged in accordance with a Bayer color filter array pattern as described in U.S. Pat. 3,971,065, "Color Imaging Array" by B. E. Bayer, assigned to Eastman Kodak Co. and incorporated herein by reference, with green photosites arranged in a checkerboard pattern and red and blue pixels arranged on alternate lines. The horizontal output register 42 includes a first horizontal transfer register 50 for green image pixel signals and a second horizontal transfer register 52 for red and blue image pixel signals.

In operation, signal charge packets from each of the lines of photoactive pixels are clocked through the four rows of vertical transfer registers 44 including the charge clearing structures 46. When a given line is clocked from the imaging array into the "gate 1" row of vertical transfer registers 44, for example, the signal charge from the first and fifth columns of the line is transferred to the drains 38 of the charge clearing structures 46 if the gate 1 signal is activated. In all other columns of the line (for example columns 2, 3, 4, 6, 7) the signal charge is unaffected. If the gate 1 signal is turned off, the charge clearing structures 46 in the gate 1 row of vertical transfer registers 44 are disabled, and the signal charge packets transferred from the array 40 to the gate 1 row are unaffected. By incorporating four "charge clearing" rows having charge clearing structures 46 offset in different columns, it is possible to eliminate all of the signal charge packets from a given image line by turning on the "clear" signals as the line of image pixel signals passes through the gate 1, gate 2, gate 3 and gate 4 vertical transfer rows 44.

In a still mode of operation, all of the charge clearing structures 46 are disabled, thereby allowing all of the signal charge packets to be clocked into the horizontal output register 42. The green image pixel signals are subsequently clocked out of the first horizontal transfer register 50 and the red and blue image pixel signals are clocked out of the second horizontal transfer register 52. The color filter array pattern is designed to provide the best image possible in the high resolution still mode of operation.

An NTSC resolution image is obtained in a motion mode of operation by selectively activating the charge clearing structures 46. As line one of the image passes through the vertical transfer registers 44, gate 1 is turned off, but gate 2, gate 3 and gate 4 are turned on. Thus, only the red image pixel signals associated with every other odd column, i.e. columns 1, 5, 9, etc., are transferred to the horizontal output register 42. The image pixel signals representing the green pixels and the alternate red pixels of line one are drained off by the activated charge clearing structures 46. In order to read out image line 2, the gate 4 signal is turned off and the other three signals are turned on, thus passing every other blue image pixel signal to the horizontal output register 42. Following the transfer of the blue image pixel signals, the second horizontal transfer register is clocked once to put the blue pixels in their proper location. All of the green image pixel signals for the third image line are kept by deactivating all of the charge clearing structures 46 as the third image line is clocked through the rows of vertical transfer registers 44. The fourth line of image pixel signals can either be eliminated by turning on all four gate signals or can also be passed to the first horizontal transfer register 50 and summed with the green pixels from the other image lines. The next field of the NTSC signal is "staggered" vertically by shifting the sampling by two lines in the vertical direction.

Figure 5:
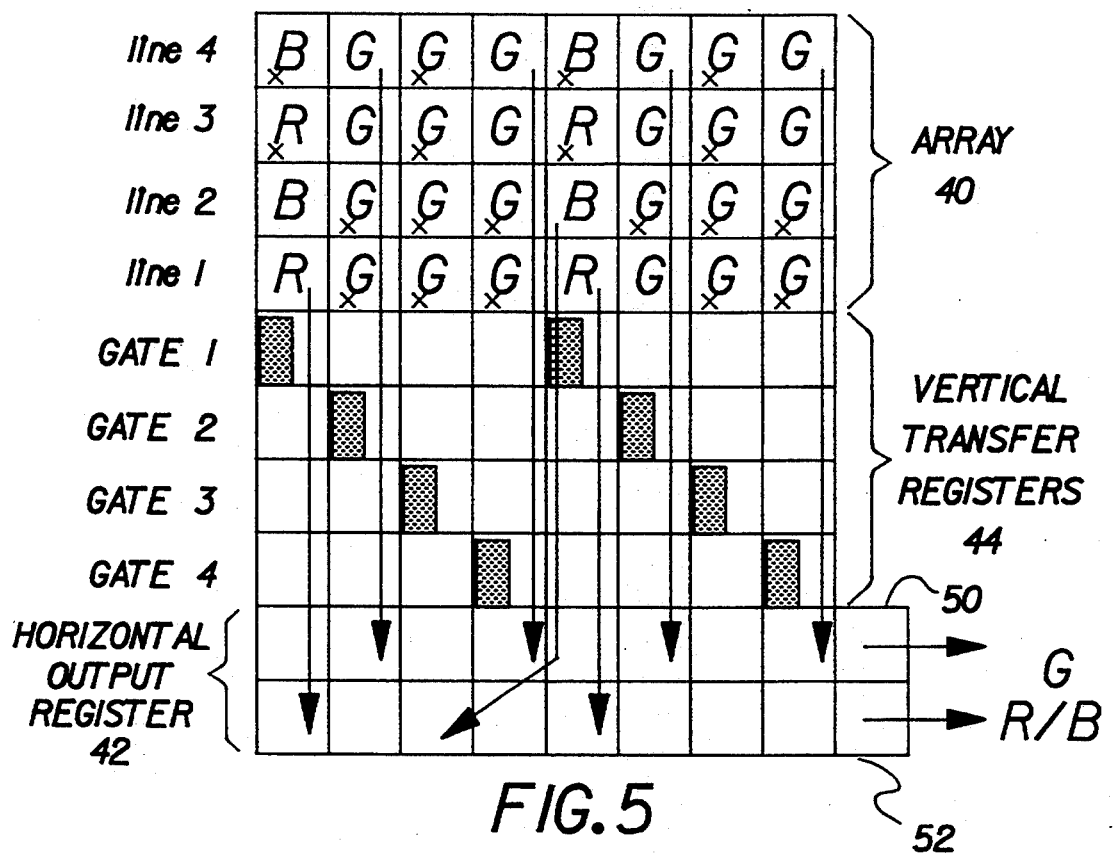
FIG. 5 illustrates the use of a different color filter array with the electronic image sensor structure shown in FIG. 4.

FIG. 5 shows how the same basic image sensor architecture illustrated in FIG. 4 can be used with a different color filter array pattern, for example a "3G" non-interlaced striped CFA, as described in U.S. Pat. No. 4,663,661 "Single Sensor Color Video Camera with blurring filter" by J. S. Weldy and S. H. Kristy, assigned to Eastman Kodak Company and incorporated herein by reference, to generate an NTSC signal. In this example, the red and blue image pixel signals are clocked into the horizontal output register 42 by turning off the gate 1 signal and turning on the gate 2, gate 3 and gate 4 signals. The second horizontal transfer register 52 is clocked twice before summing. The third and fourth image lines are clocked into and summed in the horizontal output register by turning off the gate 2 and gate 4 signals and turning on the gate 1 and gate 3 signals. The fourth image lines can alternatively be discarded by turning on the gate 2 and gate 4 signals. As in the case illustrated in FIG. 4, a still mode of operation is obtained by deactivating all of the gate signals.

Figure 6:
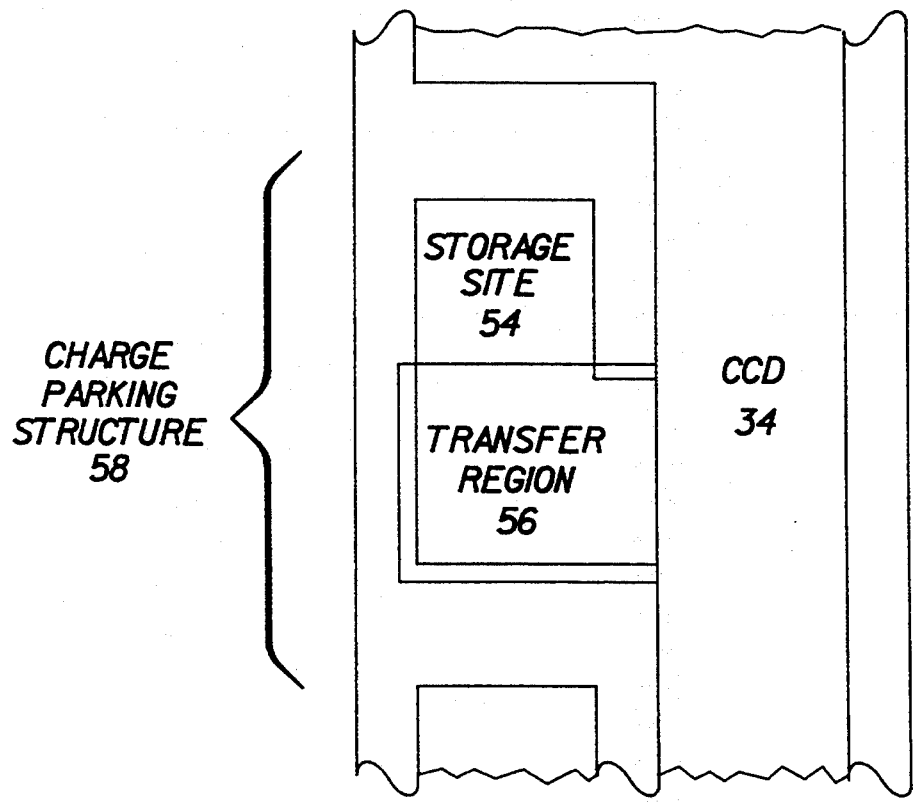
FIG. 6 illustrates a charge parking structure utilized in a second embodiment of the invention.

Referring now to FIG. 6, a charge "parking" or storage structure 58 is shown including a storage site 54 and a transfer gate or region 56 located adjacent to the CCD register 34. The charge parking structure 58 is used in conjunction with the charge clearing structure 46 described above in a second embodiment of the invention. In operation, the transfer region 56 of the charge parking structure 58 is activated to transfer a signal charge packet from the CCD register 34 to the storage site 54. The storage site 54 can be used to sum signals from different non-adjacent rows of the array of pixels.

The charge is stored by setting the channel potential of the storage site 54 to a higher potential than the transfer region 56, which is likewise at a higher channel potential than the adjacent CCD register 34. To later sum the stored charge with a non-adjacent row of charge which has been shifted into CCD register 34, the channel potential of the CCD register 34 must be brought higher than that of the transfer region 56, which must be higher than that of the storage site 54. Otherwise, during readout of CCD register 34, the transfer region 56 is brought to a lower channel potential than in CCD register 34 or the storage site 54 to create a barrier and prevent the transfer of charge between them.

Figure 7:
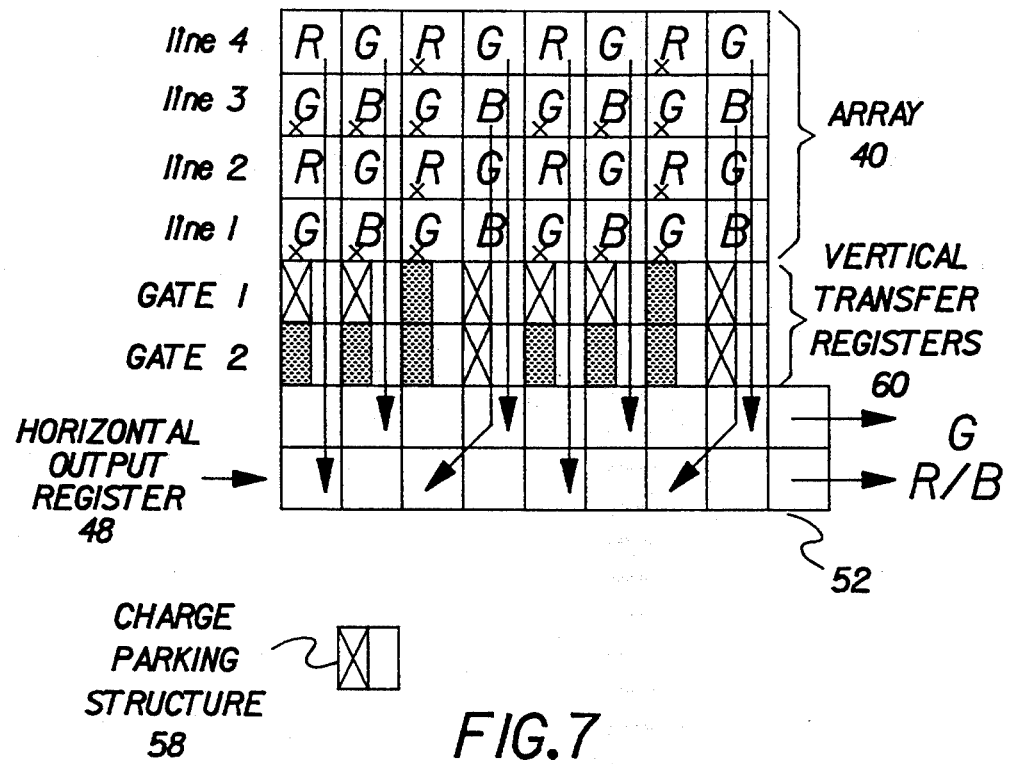
FIG. 7 illustrates an electronic image sensor in accordance with a second embodiment of the invention that utilizes the charge parking structure illustrated in FIG. 6 and the charge clearing structure illustrated in FIG. 3.

FIG. 7 illustrates an electronic image sensor in accordance with a second embodiment of the invention. The image sensor is shown having four image lines and two rows of vertical transfer registers 60 which include both charge clearing structures 46 and charge parking structures 58. As in the structure illustrated in FIG. 5, electronic image sensor also includes a horizontal output register 42 having first and second horizontal transfer registers 50, 52 as shown in FIGS. 4 and 5.

In operation, the charge clearing structure 58 location in column four of the gate 2 row, for example, allows the blue pixel values from image line one and image line three to be summed, even though there is a green pixel value between these two blue values. To obtain an NTSC resolution image, image lines 1 and 2 are clocked into the gate 1 and gate 2 rows. In the gate 2 row, the image line 1 blue pixel values from columns 4, 8, etc. are parked or stored while the green pixels and the remaining blue pixels are cleared discarded. In the gate 1 row, the green pixels and alternate red pixels are parked while the remaining red pixels are discarded or cleared. Image lines three and four are subsequently clocked into the gate 1 and gate 2 rows. In the gate 2 row, the line 3 blue pixel values from columns 4, 8 etc. are summed with the line one blue pixel values, while the green pixels and the remaining blue pixels are cleared. In the gate 1 row, the line 4 red pixel values from columns three and seven etc are cleared, while the green pixels and the remaining red pixels are summed with the values in the charge parking registers. Finally, the image pixel signals are transferred into the horizontal output register.

One additional problem with NTSC motion/still systems is that it may be desirable to use different image aspect ratios for the motion and still modes. For example, NTSC uses a 4:3 aspect ratio image, while the requirement for high resolution stills may be a 3:2 aspect ratio as utilized, for example, in the Kodak Photo CD System. The electronic image sensor is therefore required to have a 1024×1536 image array to provide a 3:2 aspect ration, while for the NTSC mode, it might be desirable to use only 960×1280 pixels from the electronic image sensor to provide a 4:3 aspect ratio image.

Figure 8:
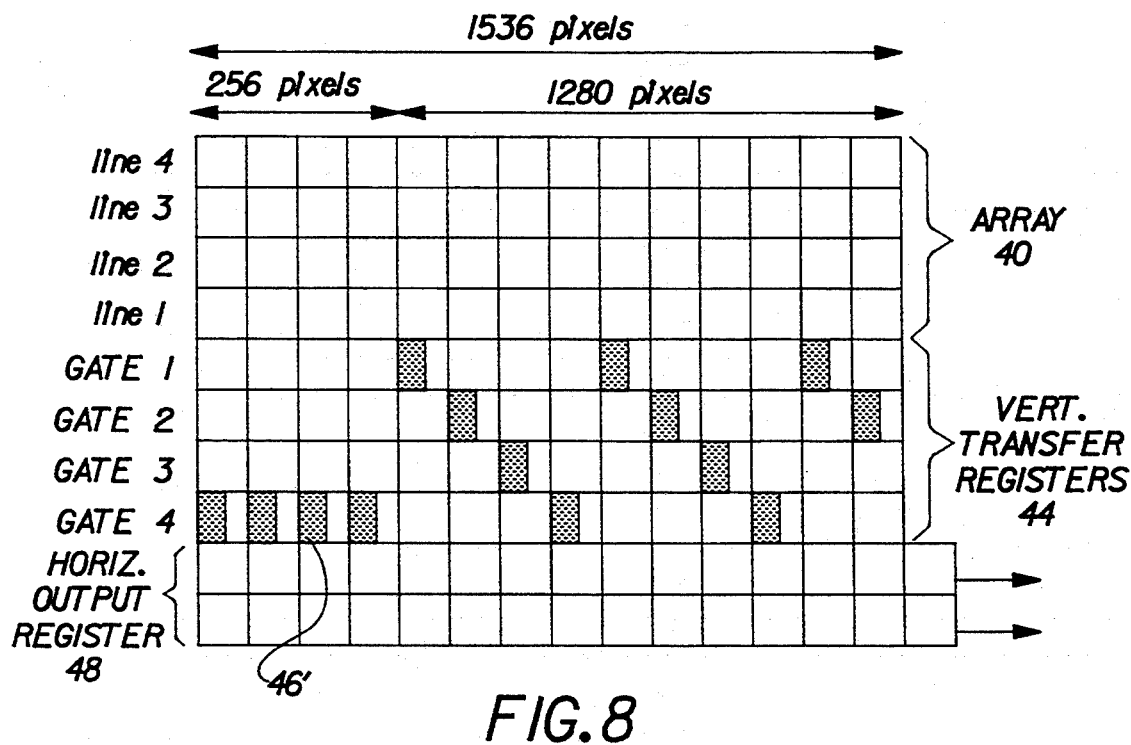
FIG. 8 illustrates a third embodiment of the invention that incorporates aspect ratio conversion.

A method of facilitating the readout of different aspect ratio images is shown in FIG. 8. The structure shown in FIG. 8 utilizes 256 "aspect ratio charge clearing" structures 46' of the type shown in FIG. 3 placed in the end of at least one row of the vertical transfer registers 44, between the image array 40 containing the photosensitive pixels, and the horizontal output register 48. When activated by a signal supplied by the camera control processor unit 14, the aspect ratio charge clearing structures 46' eliminate the signals from the columns at the left side of the image array 40 as the image lines are clocked out. As a result, the horizontal output register 48 does not receive charge from these columns.

It should be noted that there is insufficient time to clock out all of the 256 extra pixels at the end of each NTSC image line, so that charge from these extra pixels would end up at the right hand side of the horizontal readout register 48 without the use of the aspect ratio charge clearing structures 46'. In such a case, this charge would be added to the right side of the next new line of the image causing a serious artifact. The aspect ratio charge clearing structures 46' eliminate the signals from these pixels so that the next image line contains only the proper signal charge, namely, only the 1280 horizontal pixels needed to be clocked out.

Figure 9:
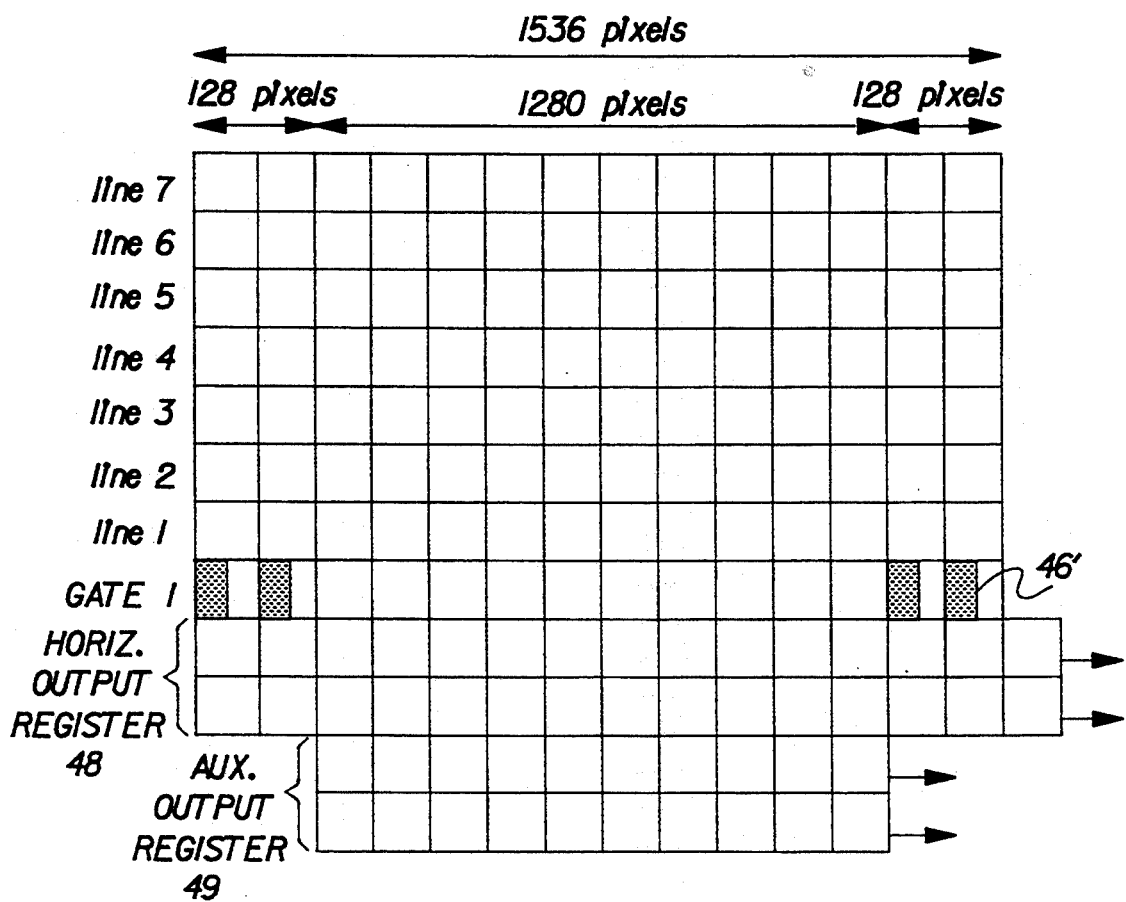
FIG. 9 illustrates a fourth embodiment of the invention that incorporates aspect ratio conversion.

A second embodiment that compensates for the differences in aspect ratios is shown in FIG. 9. The second structure utilizes a second auxiliary horizontal output register 49. The second horizontal output register 49 is centered in the middle of the image array 40 and has 256 fewer elements than the normal horizontal output register 48. Aspect ratio charge clearing structures 46' are used to dispose of the charge in the first and last 128 columns of the image array which are not used in the NTSC readout mode.

The invention has been described with reference to certain preferred embodiments thereof. It will be understood, however, that modifications and variations are possible within the scope of the appended claims. For example, the aspect ratio charge clearing structures need not be located within the same row of vertical transfer registers, but can be located in several rows if desired.

INDUSTRIAL UTILITY

The invention can be utilized in electronic imaging systems to permit high resolution still images to be produced at low frame rates, while also allowing standard NTSC motion image signals to be produced by the same system. The invention is particularly applicable to commercial camcorder devices.

What is claimed is:

1. An electronic image sensor comprising:
    a row and column array of photosensitive pixels for generating image pixel signals in response to incident radiation; a horizontal output register; and vertical transfer means for transferring the image pixel signals generated by the photosensitive pixels to the horizontal output register;
    wherein the vertical transfer means includes pixel dumping means for selectively preventing the image pixel signals generated in at least one of the columns of each row of the array of photosensitive pixels from being transferred to the horizontal output register;
    wherein the vertical transfer means includes a row and column array of vertical transfer registers and the pixel dumping means includes a plurality of charge clearing structures in each row of vertical transfer registers; and
    wherein the charge clearing structures of each row of vertical transfer registers are offset in different columns from the charge clearing structures of all other rows of vertical transfer registers.

2. The electronic image sensor of claim 1, wherein the vertical transfer means further comprises charge parking means for temporarily storing signal charge from at least one of the columns of each row of the array of photosensitive pixels, wherein signal charge packets from multiple rows of the array are summed in the charge parking means.

3. The electronic image sensor of claim 1, wherein the horizontal output register includes first and second horizontal transfer registers.

4. The electronic image sensor of claim 1, further comprising an auxiliary horizontal output register, wherein the auxiliary horizontal output register has a shorter line length than the horizontal output register.

5. The electronic image sensor of claim 4, wherein the horizontal output register and the auxiliary horizontal output register each include first and second horizontal transfer registers.

6. The electronic image sensor of claim 1, wherein the row and column array of vertical transfer registers comprises at least four rows.

7. An electronic imaging system comprising:
    an electronic imaging sensor; an optical system for imaging scene light onto the electronic imaging sensor; a camera control processor coupled to the electronic imaging sensor; an operator control unit coupled to the camera control processor; and an image data storage unit coupled to the output of the electronic imaging sensor;
    wherein the camera control processor controls the electronic imaging sensor to operate in either a still image mode or a motion image mode in response to a mode signal received from the operator control unit;
    wherein the electronic imaging sensor comprises a row and column array of photosensitive pixels for generating image pixel signals in response to incident radiation, a horizontal output register, and vertical transfer means for transferring the image pixel signals generated by the photosensitive pixels to the horizontal output register, said vertical transfer means including pixel dumping means for selectively preventing the image pixel signals generated in at least one of the columns of each row of the array of photosensitive pixels from being transferred to the horizontal output register;
    wherein the vertical transfer means includes a row and column array of vertical transfer registers and the pixel dumping means includes a plurality of charge clearing structures in each row of vertical transfer registers; and wherein the charge clearing structures of each row of vertical transfer registers are offset in different columns from the charge clearing structures of all other rows of vertical transfer registers.

8. The electronic imaging system of claim 7, wherein the vertical transfer means further comprises charge parking means for temporarily storing signals from at least one of the columns of each row of the array of pixels, wherein signals from multiple rows of the array are summed in said charge parking means.

9. The electronic imaging system of claim 7, wherein the horizontal output register includes first and second horizontal transfer registers.

10. The electronic imaging system of claim 7, further comprising an auxiliary horizontal output register, wherein the auxiliary horizontal output register has a shorter line length than the horizontal output register.

11. The electronic imaging system of claim 10, wherein the horizontal output register and the auxiliary horizontal output register each include first and second horizontal transfer registers.

12. The electronic imaging system of claim 7, wherein the row and column array of vertical transfer registers comprises at least four rows.

* * * * *